(12) United States Patent
Sutton et al.

(10) Patent No.: US 7,980,841 B2
(45) Date of Patent: Jul. 19, 2011

(54) DEFINED RATIO DUAL-WALL PIPE DIE

(75) Inventors: Gerald S. Sutton, Hamilton, OH (US);
Randall A. Kolbet, Liberty Township, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 355 days.

(21) Appl. No.: 12/036,429

(22) Filed: Feb. 25, 2008

(65) Prior Publication Data

US 2008/0203608 A1 Aug. 28, 2008

Related U.S. Application Data

(60) Provisional application No. 60/903,312, filed on Feb. 26, 2007.

(51) Int. Cl.
*B29F 3/10* (2006.01)
*B29C 47/06* (2006.01)
*B29C 45/22* (2006.01)

(52) U.S. Cl. ............... 425/133.1; 264/209.8; 425/381; 425/382 R; 425/382.4

(58) Field of Classification Search ............ 425/130, 425/133.1, 381, 382.4, 382 R; 264/209.8
See application file for complete search history.

(56) References Cited

U.S. PATENT DOCUMENTS

| | | |
|---|---|---|
| 2,700,631 A | 1/1955 | Sussenbach et al. |
| 2,753,596 A | 7/1956 | Bailey |
| 2,877,150 A | 3/1959 | Wilson |
| 2,888,954 A | 6/1959 | Gates |
| 2,931,069 A | 4/1960 | McCormick |
| 3,081,102 A | 3/1963 | Murray et al. |
| 3,221,371 A * | 12/1965 | Stevens ............ 425/465 |
| 3,379,805 A | 4/1968 | Roberts |
| 3,490,496 A | 1/1970 | Stearns |
| 3,538,209 A | 11/1970 | Hegler |

(Continued)

FOREIGN PATENT DOCUMENTS

DE 1 278 734 9/1968

(Continued)

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

(Continued)

*Primary Examiner* — Kat Wyrozebski
*Assistant Examiner* — Nahida Sultana
(74) *Attorney, Agent, or Firm* — Finnegan, Henderson, Farabow, Garrett & Dunner, LLP

(57) ABSTRACT

A pipe extrusion die may be provided having an inner flow passageway having a first cross-sectional area, and an outer flow passageway having a second cross-sectional area, both being in communication with an inlet flow passageway. A ratio adjusting tube may be movably disposed in blocking engagement between the inlet flow passageway and the inner flow passageway. The ratio adjusting tube and the outer flow passageway both may be substantially concentric with the inner flow passageway. Material may be distributed from the inlet flow passageway to the inner and outer flow passageways. The method and apparatus may allow for the manual and automatic control of the proportion of material distributed between the inner and outer flow passageways by adjusting the position of the ratio adjusting tube in relation to a passageway between the inlet flow passageway and the inner flow passageway, based on various operating parameters.

20 Claims, 1 Drawing Sheet

U.S. PATENT DOCUMENTS

| | | | |
|---|---|---|---|
| 3,573,871 A | 4/1971 | Warner | |
| 3,605,232 A | 9/1971 | Hines | |
| 3,649,730 A | 3/1972 | Lachenmayer et al. | |
| 3,677,676 A | 7/1972 | Hegler | |
| 3,725,565 A | 4/1973 | Schmidt | |
| 3,819,292 A | 6/1974 | Wentworth | |
| 3,820,927 A * | 6/1974 | Toomajanian | 425/113 |
| 3,824,886 A | 7/1974 | Hegler | |
| 3,837,364 A | 9/1974 | Jenner | |
| 3,869,235 A | 3/1975 | Moore | |
| 3,944,641 A | 3/1976 | Lemelson | |
| 3,957,386 A | 5/1976 | Lupke | |
| 4,042,661 A | 8/1977 | Cook | |
| 4,113,411 A | 9/1978 | Terragni | |
| 4,165,214 A | 8/1979 | Lupke et al. | |
| 4,180,357 A | 12/1979 | Lupke | |
| 4,218,164 A | 8/1980 | Lupke | |
| 4,219,293 A | 8/1980 | Licht | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,279,857 A * | 7/1981 | Feuerherm | 264/541 |
| 4,281,981 A | 8/1981 | Feldman | |
| 4,319,476 A | 3/1982 | Fuchs, Jr. | |
| 4,352,701 A | 10/1982 | Shimba et al. | |
| 4,362,488 A * | 12/1982 | Casals et al. | 425/113 |
| 4,377,545 A | 3/1983 | Hornbeck | |
| 4,382,766 A * | 5/1983 | Feuerherm | 425/465 |
| 4,397,797 A | 8/1983 | Nojiri et al. | |
| 4,402,658 A | 9/1983 | Larsen | |
| 4,436,679 A | 3/1984 | Winstead | |
| 4,439,130 A | 3/1984 | Dickhut et al. | |
| 4,472,129 A * | 9/1984 | Siard | 425/381 |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A | 8/1985 | Lupke | |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A | 10/1988 | Hegler et al. | |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,970,351 A | 11/1990 | Kirlin | |
| 5,030,077 A * | 7/1991 | Orimoto et al. | 425/130 |
| 5,045,254 A | 9/1991 | Peelman et al. | |
| 5,058,934 A | 10/1991 | Brannon | |
| 5,089,074 A | 2/1992 | Winter et al. | |
| 5,102,602 A * | 4/1992 | Ziegler | 264/209.2 |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,162,121 A * | 11/1992 | Kawaguchi et al. | 425/130 |
| 5,192,834 A | 3/1993 | Yamanishi et al. | |
| 5,204,120 A * | 4/1993 | Hirschberger | 425/132 |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,314,553 A | 5/1994 | Hashimoto et al. | |
| 5,330,600 A | 7/1994 | Lupke | |
| 5,346,384 A | 9/1994 | Hegler et al. | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A * | 11/1995 | Lupke | 264/39 |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,762,848 A * | 6/1998 | Beckwith | 264/176.1 |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkylä et al. | |
| 5,976,298 A | 11/1999 | Hegler et al. | |
| 6,000,434 A | 12/1999 | Winter et al. | |
| 6,016,848 A | 1/2000 | Egres, Jr. | |
| 6,039,082 A | 3/2000 | Winter et al. | |
| 6,045,347 A * | 4/2000 | Hegler | 425/133.1 |
| 6,062,268 A | 5/2000 | Elsässer et al. | |
| 6,082,741 A | 7/2000 | Gregoire et al. | |
| 6,161,591 A | 12/2000 | Winter et al. | |
| 6,186,182 B1 | 2/2001 | Yoon | |
| 6,199,592 B1 | 3/2001 | Siferd et al. | |
| 6,240,969 B1 | 6/2001 | Wildermuth | |
| 6,335,101 B1 | 1/2002 | Haeger et al. | |
| 6,399,002 B1 | 6/2002 | Lupke et al. | |
| 6,405,974 B1 | 6/2002 | Herrington | |
| 6,461,078 B1 | 10/2002 | Presby | |
| 6,491,994 B1 | 12/2002 | Kito et al. | |
| 6,524,519 B1 | 2/2003 | Ohba et al. | |
| 6,555,243 B2 | 4/2003 | Flepp et al. | |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,793,475 B2 * | 9/2004 | Schmidt et al. | 425/133.1 |
| 6,848,464 B2 | 2/2005 | Ransom | |
| 6,848,478 B2 | 2/2005 | Nagai | |
| 6,854,168 B2 | 2/2005 | Booms et al. | |
| 6,933,028 B2 | 8/2005 | Milhas | |
| 6,935,378 B2 | 8/2005 | Ikemoto et al. | |
| 6,955,780 B2 | 10/2005 | Herrington | |
| 7,074,027 B2 | 7/2006 | Starita | |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 | 1/2007 | Kanao | |
| 7,185,894 B2 | 3/2007 | Kish et al. | |
| 7,347,225 B2 | 3/2008 | Nobileau | |
| 7,731,489 B2 * | 6/2010 | Fairy | 425/130 |
| 7,766,647 B2 * | 8/2010 | Dewar et al. | 425/564 |
| 2002/0179232 A1 | 12/2002 | Thompson | |
| 2003/0077347 A1 * | 4/2003 | Miebach | 425/133.1 |
| 2003/0161977 A1 * | 8/2003 | Sabin et al. | 428/35.7 |

| | | | |
|---|---|---|---|
| 2004/0146696 A1 | 7/2004 | Jones | |
| 2004/0183224 A1* | 9/2004 | Balzer et al. | 264/171.26 |
| 2004/0187946 A1 | 9/2004 | Herrington | |
| 2004/0241368 A1 | 12/2004 | Iwata et al. | |
| 2006/0293159 A1 | 12/2006 | Neubauer | |
| 2007/0204929 A1 | 9/2007 | Jarvenkyla | |
| 2008/0118596 A1 | 5/2008 | Hetzner et al. | |

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |
| DE | 297 06 045 | 6/1997 |
| EP | 0 041 252 | 12/1981 |
| EP | 0 096 957 B1 | 5/1989 |
| EP | 0 385 465 A2 | 3/1990 |
| EP | 0 385 465 B1 | 3/1990 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1 148 277 | 4/1969 |
| GB | 2 300 684 | 11/1996 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

*Modern Plastics Worldwide*, Apr. 2008 edition, p. 35, "Device offers alternative for constant flow filtration."

U.S. Appl. No. 11/078,323, filed Mar. 14, 2005, entitled "Corrugated Pipe with Outer Layer".

Non-final Office Action dated Jul. 3, 2007, in U.S. Appl. No. 11/078,323.

Final Office Action dated Dec. 27, 2007, in U.S. Appl. No. 11/078,323.

Non-final Office Action dated May 29, 2008, in U.S. Appl. No. 11/078,323.

* cited by examiner

DEFINED RATIO DUAL-WALL PIPE DIE

RELATED APPLICATIONS

The present disclosure claims the right to priority based on U.S. Provisional Patent Application No. 60/903,312 filed Feb. 26, 2007.

FIELD OF THE INVENTION

The present invention relates to a method and apparatus for producing pipes, and more particularly, to a dual-layer pipe extrusion die having a distribution portion that forms an initial annular flow path for both pipe layers.

BACKGROUND OF THE INVENTION

Materials, such as thermoplastic resins, have been used to form pipes including, for example, those having a multilayer design. In some cases, the materials are heated, melted, or extruded, such as through the use of a die having a predetermined shape. Melted resin is provided from a heated source to one or more distributors where the resin is urged into an annular shape.

Traditionally, multilayer pipes are made by extrusion dies having a number of distributors corresponding to the number of layers, or walls, in the pipe. Such dies generally involve the use of a separate plastic extruder for each layer. For example, a dual-wall extrusion die might have two side-feed distributors, each having a corresponding extruder, which is adjusted to control the level of flow for each wall.

The prior art extrusion die designs suffer from several deficiencies. For instance, the use of more than one extruder and distributor increases the number of parts and the cost of production and repair. In extrusion dies which split the flow close to the material exit, there is very little control over the resulting ratio of division. Specifically, because there is a short flow distance between the split and the material exit, there is little resistance to flow. This causes undesirable sensitivity to changes in material properties due to various parameters, such as time, temperature, pin and bushing changes, and switches between raw material lots. This sensitivity results in undesired changes in the ratio of the volumetric flow rate to each layer. Moreover, existing extrusion die designs having a single distributor fail to adequately control material flow properties, such as shear rate and shear stress. As a result, the end product is produced at higher temperatures and pressures, and has greater material thickness variation. Higher temperatures and pressures result in increased production costs. Greater material thickness variation necessitates an increase in raw material usage and, therefore, results in further increases in production costs. The inability to adequately control material flow properties in the prior art thus reduces the efficiency and increases the cost of the extrusion process.

Accordingly, there is a need for an improved extrusion die apparatus and process for improving the efficiency and cost of the extrusion process.

SUMMARY OF THE INVENTION

In accordance with one disclosed exemplary embodiment, a pipe extrusion die apparatus is provided that may include an inner flow passageway having a first cross-sectional area and an outer flow passageway substantially concentric with the inner flow passageway. The outer flow passageway may have a second cross-sectional area. The pipe extrusion die apparatus also may include an inlet flow passageway in communication with the inner and outer flow passageways, and a ratio adjusting tube substantially concentric with the inner and outer flow passageways. The ratio adjusting tube may be movably disposed in blocking engagement between the inlet flow passageway and the inner flow passageway.

In accordance with a further disclosed exemplary embodiment, the inner and outer flow passageways may communicate with the inlet flow passageway at a location substantially proximate to the ratio adjusting tube.

In accordance with a further disclosed exemplary embodiment, a multilayer pipe extrusion die apparatus is provided that may include an inner flow passageway having a first cross-sectional area and an outer flow passageway substantially concentric with the inner flow passageway. The outer flow passageway may have a second cross-sectional area. The multilayer pipe extrusion die apparatus also may include an inlet flow passageway that communicates with the inner and outer flow passageways. The apparatus may include a ratio adjusting tube substantially concentric with the inner and outer flow passageways. The ratio adjusting tube may be movably disposed in blocking engagement between the inlet flow passageway and the inner flow passageway. The inner and outer flow passageways may communicate with the inlet flow passageway at a location substantially proximate to the ratio adjusting tube.

In accordance with a further disclosed exemplary embodiment, a method for distributing material through a pipe extrusion die apparatus is provided. The method may include the steps of providing an inner flow passageway having a first cross-sectional area, and an outer flow passageway, substantially concentric with the inner flow passageway, the outer flow passageway having a second cross-sectional area. The method also may include the steps of providing an inlet flow passageway in communication with the inner and outer flow passageways, and providing a ratio adjusting tube substantially concentric with the inner and outer flow passageways. The ratio adjusting tube may be movably disposed in blocking engagement between the inlet flow passageway and the inner flow passageway. Finally, the method may include the steps of distributing material from the inlet flow passageway to the inner and outer flow passageways, and controlling the proportion of material conveyed between the inner and outer flow passageways by moving the ratio adjusting tube in relation to the first cross-sectional area.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawing, which is incorporated in and constitutes a part of this specification, illustrates an embodiment of the invention, and together with the description, serves to explain the principles of the invention.

As such, those skilled in the art will appreciate that the conception upon which this disclosure is based may readily be utilized as a basis for designing other structures, methods, and systems for carrying out the several purposes of the present invention. It is important, therefore, that the claims be

DESCRIPTION OF THE EXEMPLARY EMBODIMENTS

Figure 1:
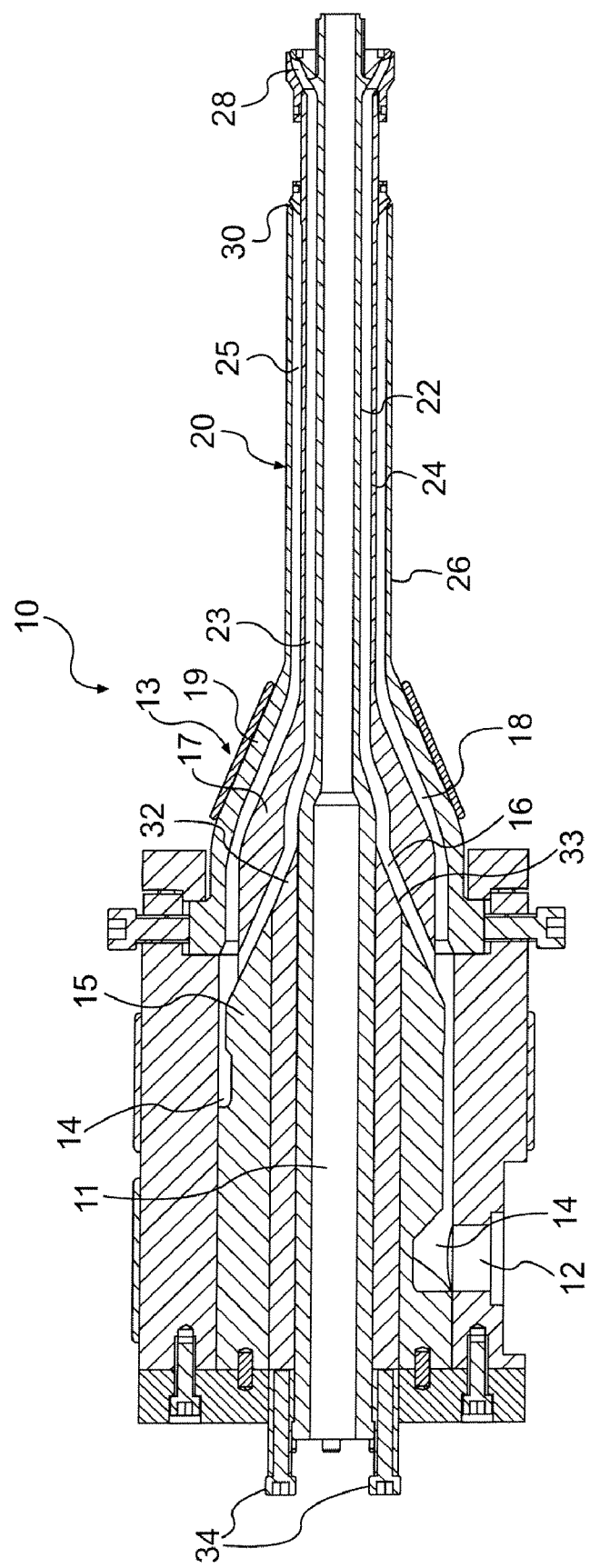
FIG. 1 is a cross-sectional view illustrating one embodiment of a dual-wall pipe extrusion die consistent with the present invention.

Reference will now be made in detail to the present embodiments of the invention, an example of which is illustrated in the accompanying drawing.

FIG. 1 illustrates one embodiment of a pipe extrusion die 10. Pipe extrusion die 10 may include an opening 11 in the center of pipe extrusion die 10 for transporting water vacuum and compressed air. Pipe extrusion die 10 also may include an inlet flow passageway 12. Inlet flow passageway 12 may be in communication with a material supply such as an extruder for plastic pellets. Inlet flow passageway 12 also may be disposed in communication with a distributor portion 14 of pipe extrusion die 10. Distributor portion 14 may be formed by an annular passageway that is configured in any manner so long as it, for instance, distributes melted plastic into a suitably shaped flow path, such as an annular shape. As illustrated, distributor portion 14 may be a side-feed distributor. Alternatively, pipe extrusion die 10 may include any type of distributor, such as, for example, a spiral- or basket-type distributor. Distributor portion 14 may be in communication with an inner flow supply 16 and an outer flow supply 18. Inner flow supply 16 may have an inner annular cross-section which changes in dimension along the length of pipe extrusion die 10. Outer flow supply 18 may have an outer annular cross-section which changes in dimension along the length of pipe extrusion die 10. Specifically, inner flow supply 16 and outer flow supply 18 may be defined by a ratio defining region 13 including an inner ratio definer 15, a middle ratio definer 17, and an outer ratio definer 19. Ratio defining region 13 of pipe extrusion die 10 may be precisely designed to define the ratio between the inner annular cross-section of inner flow supply 16 and the outer annular cross-section of outer flow supply 18. Specifically, ratio defining region 13 may control the proportion of material directed to inner flow supply 16 compared to that directed to outer flow supply 18. In one embodiment, inner ratio definer 15, middle ratio definer 17, and outer ratio definer 19 may be configured to provide about 30% of the total flow through inner flow supply 16 and about 70% of the total flow through outer flow supply 18. In another embodiment, ratio defining region 13 may be designed such that inner flow supply 16 receives about 32% of the total flow.

Inner flow supply 16 and outer flow supply 18 may provide the melted plastic therein to a mandrel section 20. Mandrel section 20 may include three concentric tubes including an inner mandrel tube 22, a middle mandrel tube 24, and an outer mandrel tube 26. Inner mandrel tube 22 and middle mandrel tube 24 may define an inner flow passageway 23. Inner flow passageway 23 may be in fluid communication with inner flow supply 16 to receive an inner flow of melted plastic from distributor portion 14. Middle mandrel tube 24 and outer mandrel tube 26 may define an outer flow passageway 25. Outer flow passageway 25 may be in fluid communication with outer flow supply 18 to receive an outer flow of melted plastic from distributor portion 14. Inner flow passageway 23 may be in fluid communication with an inner flow passageway exit 28. Outer flow passageway 25 may be in fluid communication with an outer flow passageway exit 30.

Accordingly, ratio defining region 13 and mandrel section 20 may be optimally designed to provide a desired ratio of melted plastic flow across inner flow passageway 23 and outer flow passageway 25. In operation, melted plastic may enter through inlet flow passageway 12 of pipe extrusion die 10. The melted plastic may travel through annular distributor portion 14 of pipe extrusion die 10. Downstream from distributor portion 14, the melted plastic may encounter ratio defining region 13, where the flow may be split into inner flow supply 16 and outer flow supply 18. Melted plastic within inner flow supply 16 may travel through inner flow passageway 23 of mandrel section 20. Melted plastic within outer flow supply 18 may travel through outer flow passageway 25 of mandrel section 20. Melted plastic traveling through inner flow passageway 23 and outer flow passageway 25 may be extruded into a mold via inner flow passageway exit 28 and outer flow passageway exit 30, respectively.

Pipe extrusion die 10 further may include a ratio adjusting tube 32. Ratio adjusting tube 32 may be moveably disposed in any suitable manner adjacent to inner ratio definer 15 and concentric with inner and outer flow passageways 23, 25. More specifically, ratio adjusting tube 32 may be formed in any suitable shape. For instance, ratio adjusting tube 32 may be formed by a cylindrically-shaped tube having a tapered face 33, which forms a portion of the surface defining the inner flow supply 16. Accordingly, ratio adjusting tube 32 may be in engagement with inner flow supply 16 to the extent that axial translation of ratio adjusting tube 32 along the length of pipe extrusion die 10 may result in the at least partial opening and closing of inner flow supply 16. Pipe extrusion die 10 may further include any suitable structure for adjusting the ratio adjusting tube 32. For instance, the pipe extrusion die 10 may include threaded adjusting bolts 34, which, when manually rotated, may effect linear translation of ratio adjusting tube 32. The pipe extrusion die 10 also may include a control system for automatically adjusting the ratio adjusting tube 32. Such a control system could include any suitable type of sensors and actuators for controlling the ratio adjusting tube 32 based on various parameters, such as displacement, flow rate, temperature, pressure, material type, material lot, and/or pipe thickness. Thus, ratio adjusting tube 32 may be manipulated to control the proportion of melted plastic directed between inner flow supply 16 and outer flow supply 18.

Ratio adjusting tube 32 may also be configured to choke either inner flow supply 16 or outer flow supply 18. Alternatively, ratio adjusting tube 32 may be configured to interfere with both inner flow supply 16 and outer flow supply 18, simultaneously. It is further contemplated that ratio adjusting tube 32 may be entirely omitted from pipe extrusion die 10, upon a certain design of ratio defining section 13. For example, the proportion of flow between inner flow supply 16 and outer flow supply 18 may be properly defined, adjusted, and controlled by the location and movement of inner ratio definer 15, middle ratio definer 17, and/or outer ratio definer 19.

Multi-wall pipe extrusion dies, such as the dual-wall pipe extrusion die 10 of FIG. 1, may be used in producing a wide variety of pipes having any suitable number of walls. Such multi-wall pipe extrusion dies also may be used to form pipes from any suitable material, for example, from thermoplastic materials such as a melted plastic high density polyethylene. While the material flowing through the flow passages may include high density polyethylene material, other appropriate materials suitable for distribution within a nozzle system may be utilized. For instance, in some embodiments, these materials may have different flow characteristics, such as those provided by a five or six melt index polypropylene or polyvinylchloride ("PVC"). For a thermally stable material, such as fractional melt high density polyethylene ("HDPE"), the targeted shear stress may be much lower than for a thermally less stable material, such as most grades of PVC. Other materials contemplated for use in the present extrusion die, and upon which sizing may be dependent, may include, for example, propylene and polyethylene.

Unlike conventional pipe extrusion dies, the improved pipe extrusion die, which is described herein by reference to the exemplary embodiment illustrated in FIG. 1, may be configured to maintain substantially constant material flow properties even at a relatively high material flow rate. Specifically, because the dimensions of ratio defining region 13 may be optimized according to the desired material distribution across the walls of the multi-wall pipe, a drop in head pressure across pipe extrusion die 10 may result in a decrease in melt temperature. And since sufficient dissipation of heat from extruded pipe molds is traditionally a limiting variable for production speed, a decrease in melt temperature may advantageously allow for a corresponding increase in material flow rate. Therefore, careful design of ratio defining region 13 and mandrel section 20 may allow decreases in melt temperature, and corresponding increases in production rates, efficiency, and profitability.

Ratio defining region 13 may be designed by one of several suitable methods. In one embodiment, a throughput ratio (i.e., a proportion of material flow between inner and outer flow passageways 23, 25) may be predetermined based on dimensions of the desired multi-wall pipe. Given the predetermined throughput of a first one of the passageways, the pressure drop across it may be minimized by optimization of either shear stress or shear rate. A second one of the passageways may then be designed to match the pressure drop of the first passageway, such that a reliable ratio of throughput may be obtained. In order to avoid thermal degradation which may result from insufficient shear rates (e.g., below 5/s for fractional melt HDPE), the pressure drop across one or more of the flow passageways may be given a minimum threshold. Accordingly, the flow passageways may be iteratively designed through a process of minimizing pressure drop, matching pressure drops across flow passageways, and avoiding thermal degradation. Because shear stress and shear rate both are interrelated and influential on pressure drop and throughput, either or both may be used in the design of ratio defining region 13 and/or flow passageways 23, 25.

Ratio adjusting tube 32 of the disclosed pipe extrusion die 10 also may provide advantageous control of material division across the inner and outer flow passageways 23, 25. Specifically, because the flow ratio may be controlled by, for instance, adjusting a ratio adjusting tube 32, more efficient and precise material distribution may be attained. For example, in the embodiment in which ratio defining region 13 provides for routing of 32% of the material flow to inner flow supply 16, ratio adjusting tube 32 may be adjusted to refine the amount of material flow to inner flow supply 16 to a desired 30% proportion. This adjustment may be accomplished by any suitable means, such as by manually or automatically rotating one or more adjusting bolts 34. Thus, a single adjustment may finely optimize an already closely defined flow ratio of pipe extrusion die 10.

Moreover, by splitting the flow between inner flow supply 16 and outer flow supply 18 at a location proximate to distributor portion 14 and distal from inner and outer flow passageway exits 28, 30, pipe extrusion die 10 may result in higher resistance to flow along mandrel section 20 and therefore reduced sensitivity to variables such as, for example, material property inconsistencies across material lots, pin and bushing adjustments, and temperature and viscosity variations. Increased resistance to flow sensitivity may result from the length of mandrel section 20, along which flow must travel at its already split ratio of inner and outer flow paths. The gradual drop of pressure across mandrel section 20 thus may allow the flow to exit pipe extrusion die 10 at a higher rate of material flow and with substantially more uniform properties.

Accordingly, there may be sizing and design based on maintaining substantially constant flow properties, such as shear stress and shear rate, at the walls of ratio defining region 13 and/or mandrel section 20. Moreover, the sizing may be dependent on variables including the type of material used and the desired final product dimensions. An optimal distribution rate of material may be obtained by reducing one or more pressures, shear rates, and shear stresses created in the prior art designs. Additional cost benefits may also be realized, for example, by reducing or eliminating the amount of die adjustments that may be necessary to compensate for material build-up within a pipe extrusion die system. This may include utilizing one or more materials from a single or multiple sources. In addition, an improvement in distribution of extruded material may produce a more consistent pipe structure, i.e., a pipe structure that may be less susceptible to thickness variations due to poor distribution of extruded material.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pipe extrusion die apparatus comprising:
   a straight mandrel section comprising:
     an inner flow passageway having a first cross-sectional area; and
     an outer flow passageway substantially concentric with the inner flow passageway, the outer flow passageway having a second cross-sectional area;
   an inlet flow passageway disposed in fluid communication with the inner and outer flow passageways;
   a ratio defining section disposed at an upstream end of the straight mandrel section, the ratio defining section having a ratio adjusting tube substantially concentric with, and configured to translate axially along an inner surface of, the inner flow passageway, the ratio adjusting tube having a tapered face movably disposed between being contiguous with the inner surface and being in blocking engagement between the inlet flow passageway and the inner flow passageway; and
   an outlet section disposed at a downstream end of the straight mandrel section, the outlet section having an inner flow passageway outlet and an outer flow passageway outlet.

2. The pipe extrusion die apparatus of claim 1, wherein the inner and outer flow passageways communicate with the inlet flow passageway at a location substantially proximate to the ratio adjusting tube.

3. The pipe extrusion die apparatus of claim 1, further comprising an inner flow supply disposed in fluid communication between the inlet flow passageway and the inner flow passageway; and an outer flow supply disposed in fluid communication between the inlet flow passageway and the outer flow passageway.

4. The pipe extrusion die apparatus of claim 1, wherein the inner flow passageway is disposed in fluid communication with an inner flow passageway exit and the outer flow passageway is disposed in fluid communication with an outer flow passageway exit.

5. The pipe extrusion die apparatus of claim 3, wherein the tapered face is contiguous with the inner surface when the ratio adjusting tube is axially retracted, and at least partially obstructs the inner flow supply when the ratio adjusting tube is axially extended.

6. The pipe extrusion die apparatus of claim 1, wherein the ratio adjusting tube is configured to define a ratio of material distributed between the inner flow passageway and the outer flow passageway.

7. The pipe extrusion die apparatus of claim 3, wherein the ratio adjusting tube is configured to selectively and variably block a portion of the inner flow supply.

8. The pipe extrusion die apparatus of claim 3, further comprising a plurality of threaded bolts, said plurality of threaded bolts being configured to linearly translate the ratio adjusting tube relative to the inner flow supply.

9. A multilayer pipe extrusion die apparatus comprising:
an inner flow passageway having a first, annular cross-sectional area that extends along a central axis of the die apparatus;
an outer flow passageway having a second, annular cross-sectional area that extends along the central axis, substantially concentric with the inner flow passageway;
an inlet flow passageway disposed radially outward from, and in fluid communication with, the inner and outer flow passageways;
a ratio defining region configured to convey material from the inlet flow passageway, radially inward toward the inner and outer flow passageways; and
a ratio adjusting tube disposed in the ratio defining region and configured to translate axially along an inner surface of the inner flow passageway, the ratio adjusting tube having a tapered face movably disposed between alignment with the inner surface and at least partial obstruction of the inner flow passageway, wherein the ratio adjusting tube is configured to adjust a proportion of material distributed from the inlet flow passageway between the inner flow passageway and the outer flow passageway.

10. The multilayer pipe extrusion die apparatus of claim 9, wherein the inner and outer flow passageways communicate with the inlet flow passageway at a location substantially proximate to the ratio adjusting tube.

11. The multilayer pipe extrusion die apparatus of claim 9, further comprising an inner flow supply disposed in fluid communication between the inlet flow passageway and the inner flow passageway; and an outer flow supply disposed in fluid communication between the inlet flow passageway and the outer flow passageway.

12. The multilayer pipe extrusion die apparatus of claim 9, wherein the inner flow passageway is disposed in fluid communication with an inner flow passageway exit and the outer flow passageway is disposed in fluid communication with an outer flow passageway exit.

13. The multilayer pipe extrusion die apparatus of claim 11, wherein the tapered face is contiguous with the inner surface when the ratio adjusting tube is axially retracted, and at least partially obstructs the inner flow supply when the ratio adjusting tube is axially extended.

14. The multilayer pipe extrusion die apparatus of claim 9, wherein the ratio adjusting tube is configured to define a ratio of material distributed between the inner flow passageway and the outer flow passageway.

15. The multilayer pipe extrusion die apparatus of claim 11, wherein the ratio adjusting tube is configured to selectively and variably block a portion of the inner flow supply.

16. The multilayer pipe extrusion die apparatus of claim 11, further comprising a plurality of threaded bolts, said plurality of threaded bolts being configured to linearly translate the ratio adjusting tube relative to the inner flow supply.

17. A method for distributing material through a pipe extrusion die apparatus comprising:
providing a straight mandrel section comprising an inner flow passageway having a first cross-sectional area, and an outer flow passageway, substantially concentric with the inner flow passageway, the outer flow passageway having a second cross-sectional area;
providing an inlet flow passageway radially outward from, and in communication with, the inner and outer flow passageways;
providing a ratio adjusting tube substantially concentric with, and configured to translate axially along an inner surface of, the inner flow passageway, the ratio adjusting tube having a tapered face movably disposed between being contiguous with the inner surface and being in blocking engagement between the inlet flow passageway and the inner flow passageway;
distributing material from the inlet flow passageway radially inward to the inner and outer flow passageways; and
controlling a proportion of material conveyed between the inner and outer flow passageways by translating the ratio adjusting tube axially in relation to the inner flow passageway.

18. The method of claim 17, wherein the material is one of polypropylene, polyvinylchloride, or high-density polyethylene.

19. The method of claim 17, wherein the proportion of material conveyed to the inner flow passageway is about 30%.

20. The method of claim 17, further comprising adjusting the ratio adjusting tube to maintain constant material flow properties along the straight mandrel section.

* * * * *